April 27, 1937.    M. B. PRICE ET AL    2,078,893
CLUTCH
Filed April 4, 1935    2 Sheets-Sheet 2

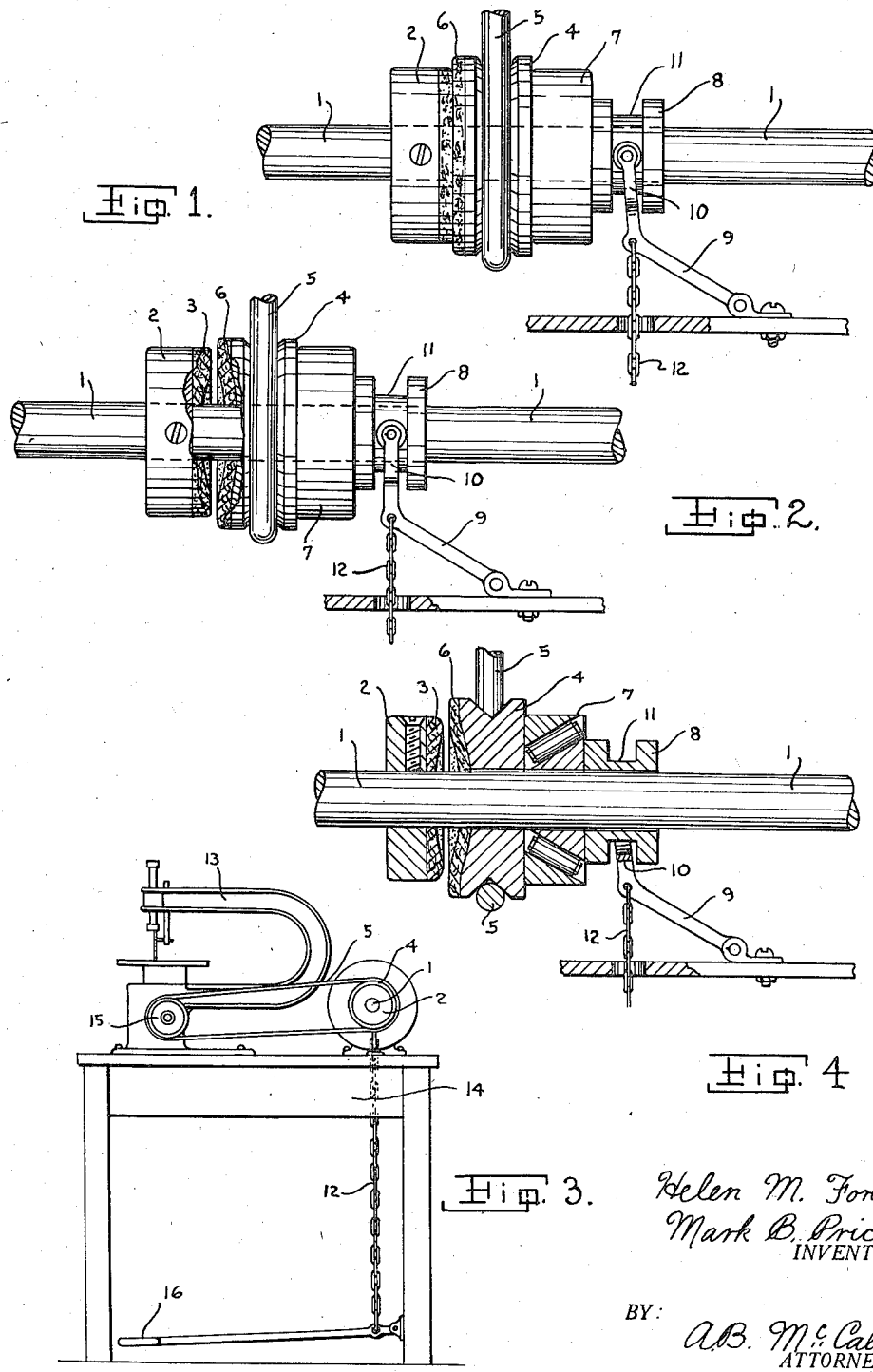

Helen M. Forestner
Mark B. Price
INVENTORS

BY A.B. McCall
ATTORNEYS.

Patented Apr. 27, 1937

2,078,893

UNITED STATES PATENT OFFICE 2,078,893

CLUTCH

Mark B. Price and Helen M. Forestner, Springfield, Ill.; said Helen M. Forestner, assignor of one-fourth to John J. Forestner, Jr., and said Price, assignor of one-tenth to Arthur B. McCall, Springfield, Ill.

Application April 4, 1935, Serial No. 14,603

2 Claims. (Cl. 192—66)

Our invention relates to clutches for transmitting power from a drive shaft to machines and more especially to machines wherein there is needed from time to time a variation in the speed of its operation; an object being in our clutch to provide a simple, practical and dependable clutch for such purposes which can be made and put on the market so cheaply that it can be used in any home or factory, easily and quickly installed and at a minimum of expense.

A particular purpose of our clutch is to provide a means of simply and conveniently regulating the speed of various bench working machines or other machines where regulation of their speed is essential to their operation with best results, such as, for instance, a jig saw, a grinder, a band saw, and the like.

We attain the objects of our invention by the clutch described in this specification defined in the claims and illustrated on one form in the drawings in which like reference numerals indicate like parts in the several figures.

Referring to the figures:

Fig. 1 is a side view of our clutch.

Fig. 2 is a side view of our clutch with a cut away disclosing interior details.

Fig. 3 is an end view of a jig saw and table using our clutch.

Fig. 4 is a longitudinal half section of our clutch.

Figure 5:
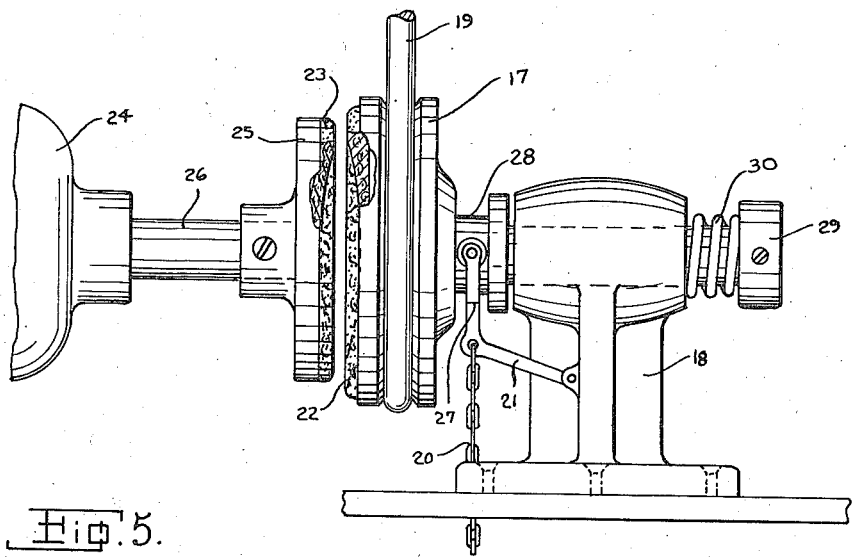
Fig. 5 is a front view of our invention where the power take off is not on the same shaft.

Referring in detail to the salient features of our clutch and to the preferred manner of operating the same, we provide on a drive shaft 1 a fixed collar 2 provided with a friction plate or disc 3 preferably made of leather so far as can now be determined from known materials and the effects obtained therewith.

We further provide a pulley member 4 slidably and rotatably mounted on shaft 1 and serving two purposes, preferably, and that is as a take off for belt member 5 and as an effective mounting or anchorage for a second friction plate or disc 6 which is secured to that side of pulley 4 which is adjacent to collar 2 so that the two friction members 3 and 6 may be operatively set up face to face.

Thus, when pulley 4 is pressed into contact with collar 2 through leather or friction disc or plate members 3 and 6 the result is that power is carried from shaft 1 through collar 2 and leather plate 3 over to leather plate 6 and pulley 4 to belt 5 which may be hooked up with any one of a number of machines adapted to be varied in their speed when in use.

Experienced machine men for instance, find that they have been limited from time to time in the delicate character of the work they could accomplish because they could not handle certain machine operations for lack of means for varying the speed of the machine in question from a low minimum to the drive shaft maximum.

For instance, in the practical use of our clutch we have a thrust bearing member 7 slidably and rotatably mounted on shaft 1; while a grooved sleeve or collar 8 is also slidably and rotatably mounted on shaft 1 so that a pressure applied to collar 8 toward thrust bearing 7 will cause pulley 4 carrying belt 5 to move over bringing leather plate 6 into friction contact with leather plate 3 causing the power carried in shaft 1 produced by a motor or other driving means, to be transmitted to pulley 4 and then to belt 5 over to the machine to which belt 5 is operatively connected.

A lever 9 which may be hingedly secured to a work table has a yoke 10 operating in groove 11 of collar 8 and adapted to exert a pressure toward thrust bearing 7 and pulley 4 when a foot pressure acts upon a chain or cable or rod 12 forcing lever 9 to exert such pressure.

It will be noted for the sake of explanation of an adaptation of our clutch that in Fig. 3 we show a jig saw 13 operatively mounted on a work table 14 where we secure the power from drive shaft 1 to operate the saw through friction carried to pulley 4 and belt 5 over to pulley 15 actuating the saw in its movements.

The speed of this saw may therefore be varied by a variation in the foot pressure upon pedal 16 pulling on chain 12 and yoke lever 9. Thus the speed of saw 13 will be varied to suit the operation by a variation in this foot pressure on pedal 16 and may vary from a low minimum to a high maximum or to the limit of the shaft speed of shaft 1.

This control of the machine speed to suit the need of the operator may be just as effective when used in connection with other machines such as grinders, shapers, planers and the like and the operation is very simple for each.

A separate clutch can be used for each machine and any part of the operator's body can be used to control the clutch, such as pressing a control with the stomach instead of pressing pedal 16 with the foot if desired.

There are, for instance, in connection with jig saw 13 cases where it is desirable to cut a delicate curve in thin wood requiring a relatively slow speed to do so and this clutch is a very effective way to do this operation.

Another feature of our clutch operation is to be found when we use oil with the leather clutch members 3 and 6.

For instance, when we drop several drops of oil down on the leather plates 3 and 6 and then press plate 6 up close to plate 3 it seems that the oil viscosity will cause a vacuum and suction between these two plates which will effectively transmit the desired power where the maximum of power is not needed. Then, too, this oil thus applied will aid in making greater friction between the friction plates than would be possible without it when the plates are pressed into pressure contact with each other.

Figure 6:
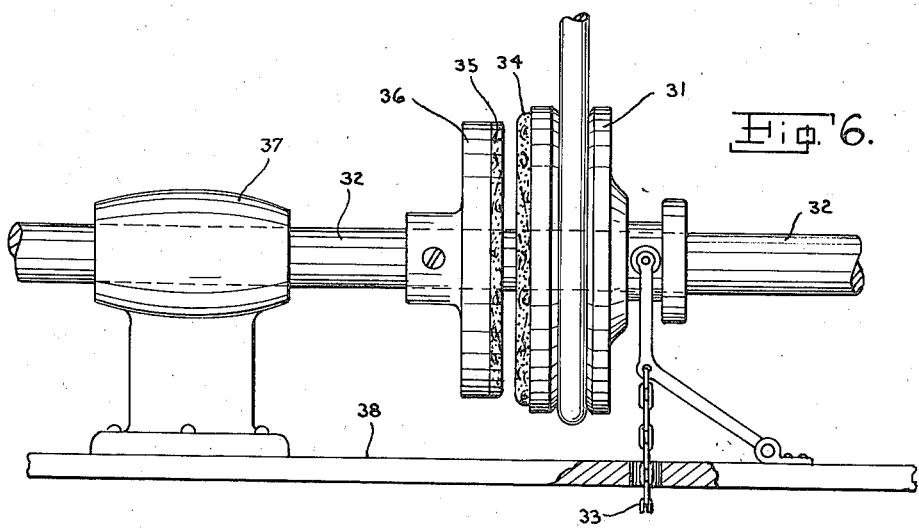
Fig. 6 is a front view of the invention where no thrust bearing is used.

It will be noted that we are including in this application and within the scope of our invention, modifications thereof, which are illustrated in Figs. 5 and 6.

For instance, in Fig. 5 it will be observed that the power take off which is a pulley 17 in this case operatively supported on a stand 18 is adapted to secure its power to run machines to which it may be connected by a belt 19 by exerting a foot pressure on a foot pedal connected with chain 20 attached to lever 21 causing this power take off pulley 17 to move leather plate 22 or other friction member over in contact with leather friction plate 23 which for the sake of explanation of the operation of our invention is operatively connected with a power source 24 adapted to run it constantly as it rotates on its support 25 fixed to shaft 26.

It will be seen that lever 21 has a yoke 27 used to operate within groove 28 defining an integral portion of power take off 17 where it serves as a means of exerting pressure when forcing this power take off member 17 over into contact with leather plate 23.

A rotating wheel 29 may be used for balancing purposes to balance pulley or power take off 17 while spring 30 is adapted to automatically retract power take off 17 from contact with the friction plate 23 when the foot pressure or other speed regulating pressure is released from its pull down on chain 20 or other connection for contacting lever 21.

Stand member 18 can be detachably secured to any machine table or other work bench for operation.

This power take off may be modified to suit the need since it is obvious that it can be a pulley as illustrated for a belt 19 or it could be a flat belt pulley or a cog wheel or a friction wheel on its outer rim if desired.

It is not material what position this power take off may operate in, whether horizontally or vertically; nor is it material just what function power take off 17 is required to perform within the scope of practical use.

It will be further observed that in Figure 6 we are illustrating another modification of our invention wherein the power take off 31 is rotatably and slidably operating on drive shaft 32 so that by a foot pressure or other bodily pressure exerted on a power control member operatively connected with control chain 33 this power take off will be made to slidably move leather plate 34 over into friction contact with leather plate 35 to get its power.

Drive shaft 32 is adapted to run constantly as it carries supporting plate 36 and is supported in suitable bearings 37 upon machine table 38.

It is obvious in this case also that power take off 31 will not be required to be a belt pulley as illustrated, but may be shaped in other forms as suggested in behalf of the possible modifications mentioned herein and above relating to Fig. 5.

Figure 7:
Fig. 7 is a detail of our leather plates or friction members in section when face to face.

It will be noted that the friction members or leather plates (see Fig. 7) are adapted to operate face to face and are preferably shaped with at least one of them concave or cupped in its formation and where possible both friction plates or leather plates are concave in their formation for the reason that there is a mechanical advantage in having these plates thus shaped since, for instance, in their concave formation, when their faces are adjacent, a few drops of oil may be dropped between the plates and then, when they are rotated, the oil is thrown to the outer periphery of the adjacent plates where such oil has a tendency to form an oil seal for the space between the plates thus effectively defining a vacuum between these plates which serves as a power transmitting suction causing the driven plate to follow the driving plate in its rotation.

Experiments with this detail of our invention have repeatedly proven to be new and successful.

Having thus set forth the salient features of our clutch and some of the preferred adaptations thereof, what we claim is:

1. As a new article of manufacture a clutch for operation with the drive shaft and comprising a fixed friction member shaped to define a cupped concave formation and a support therefor in fixed position on said shaft and a power take off wheel carrying a second friction member on the side thereof adjacent said first friction member and shaped to define a cupped concave formation and means for optionally moving said second friction member and said take off over into position to receive driving power from said first friction member at different speeds; whereby oil may be dropped upon said friction members and when rotating said oil is thrown by centrifugal force out to the outer edges of said friction members creating an oil sealed vacuum between said members and a consequent transmission of power by a suction due to said vacuum between the friction plates.

2. As a new article of manufacture a clutch for operation with the drive shaft and comprising a fixed leather plate shaped to define a cupped concave formation and a support therefor in fixed position on said shaft and a power take off wheel carrying a second leather plate on the side thereof adjacent said first leather plate and shaped to define a cupped concave formation and means for optionally moving said second leather plate and said take off over into position to receive driving power from said first leather plate at different speeds; whereby oil may be dropped upon said leather plates and when rotating said oil is thrown by centrifugal force out to the outer edges of said leather plates creating an oil sealed vacuum between said members and a consequent transmission of power by a suction due to said vacuum between the leather plates.

MARK B. PRICE.
HELEN M. FORESTNER.